United States Patent
Lange (10) Patent No.: US 7,366,372 B2
(45) Date of Patent: Apr. 29, 2008

(54) WAVEGUIDE DEVICE HAVING IMPROVED SPATIAL FILTER CONFIGURATIONS

(75) Inventor: Charles H. Lange, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 146 days.

(21) Appl. No.: 11/364,024

(22) Filed: Feb. 27, 2006

(65) Prior Publication Data

US 2007/0201792 A1 Aug. 30, 2007

(51) Int. Cl.
G02B 6/26 (2006.01)
G02B 6/42 (2006.01)
G02B 6/10 (2006.01)

(52) U.S. Cl. ......................... 385/29; 385/129
(58) Field of Classification Search ............... None
See application file for complete search history.

(56) References Cited

U.S. PATENT DOCUMENTS 5,321,779 A 6/1994 Kissa
5,475,772 A 12/1995 Hung et al.

FOREIGN PATENT DOCUMENTS

| EP | 1111411 A2 | 6/2001 |
|----|------------|--------|
| EP | 1111412 A1 | 6/2001 |
| EP | 1111413 A1 | 6/2001 |

OTHER PUBLICATIONS

EP Search Report, 07103110.8 dated May 29, 2007.

*Primary Examiner*—Michelle Connelly-Cushwa
*Assistant Examiner*—Chris H. Chu
(74) *Attorney, Agent, or Firm*—Ingrassia, Fisher & Lorenz, P.C.

(57) ABSTRACT

An optical waveguide device is provided for receiving light that has a guided mode and an unguided mode. The device comprises an optically transmissive substrate having first and second substantially opposite surfaces, an input end, and an output end. An optical waveguide region is disposed within the substrate and extends from the input to the output. A plurality of electrodes is disposed on the first surface at predetermined locations with respect to the waveguide region. The device includes a plurality of optical barriers each disposed proximate one of the first and second surfaces and positioned to block a different optical path of the unguided mode.

18 Claims, 5 Drawing Sheets

WAVEGUIDE DEVICE HAVING IMPROVED SPATIAL FILTER CONFIGURATIONS

STATEMENT REGARDING FEDERALLY SPONSORED RESEARCH OR DEVELOPMENT

This invention was made with Government support under contract no. N00030-05-C-0007 awarded by the Department of the Navy. The Government has certain rights in this invention.

FIELD OF THE INVENTION

The present invention generally relates to electro-optic waveguide devices and, more particularly, to a waveguide device having an improved spatial filter for blocking reflected light.

BACKGROUND OF THE INVENTION

Optical communications systems (e.g., integrated optic or multi-functional chips) now routinely employ electro-optic devices that utilize electrodes to modulate optical signals propagating through a waveguide formed in an optically transmissive substrate and optically coupled between an input optical fiber and one or more output optical fibers. The substrate typically comprises an electro-optic crystal, such as lithium niobate ($LiNbO_3$), that transmits substantially polarized light and undergoes a change in refractive index when exposed to an electrical voltage. Generally in such optical modulators, one or more waveguides may be formed proximate the upper surface of the substrate, and one or more surface electrodes are deposited on the surface proximate the waveguides. When a voltage is applied to the substrate via the surface electrodes, light propagating through the substrate is modulated thus producing a phase modulated optical signal.

The quality of a waveguide device's emitted optical signal is strongly influenced by the ability of the device to confine propagating light to a single polarization mode (e.g., transverse magnetic or transverse electric mode), a characteristic which is commonly referred to as the polarization extinction ratio (PER). In one known waveguide device, specifically a proton exchange polarizer, the PER is increased employing a spatial filter to block two optical paths (i.e., the primary and secondary optical paths) that the unguided transverse magnetic (TM) mode light may travel and be received at the output fiber, thus interfering with the desired optical signal. The spatial filter may utilize barriers (e.g., baffles or grooves cut into the substrate by, for example, a dicing saw) positioned at primary and secondary reflections points at the bottom of the substrate to substantially block their optical paths. Alternatively, the barriers may be regions comprising a material having a different index of refraction such that TM mode light passing therethrough is directed away from the waveguide. In the above referred to waveguide device, three barriers are disposed along the bottom surface of the substrate at locations equidistant from one another and the terminal ends of the substrate; i.e., for a substrate having a length of X, the first filter is disposed a distance $(¼)X$ from a first end of the substrate, the second filter is disposed a distance $(¼)X$ from the first filter and $(½)X$ from the first end, and the third filter is disposed a distance $(¼)X$ from the second filter and $¾X$ from the first end.

Unfortunately, spatial filter arrangements of the type described above typically block only two optical paths (i.e., the primary and secondary paths) traveled by unguided light. Thus, unguided light may still reach the output of the waveguide by a number of alternative paths. If the waveguide is bifurcated (i.e., a single input fiber feeds two output fibers), these alternative paths include the two paths traveling directly from the input fiber to each of the output fibers. Furthermore, known spatial filter arrangements do not maximize the number of obstructed light paths relative to the number of employed barriers; that is, the three barriers utilized in the known device block out two unguided light modes, the primary and secondary mode. The filter is redundant in that the first and third barriers are located at two different reflection points of the secondary optical path. As a result, known spatial filter arrangements are inefficient and do not provide optimal price-to-performance ratios.

It should thus be appreciated that it would be desirable to provide a waveguide device having a spatial filter arrangement capable of blocking more than two unguided optical paths. It should also be appreciated that it would be desirable that the waveguide be configured to maximize the number of unguided light paths that are blocked relative to the number of barriers employed. Other desirable features and characteristics of the present invention will become apparent from the subsequent detailed description of the invention and the appended claims, taken in conjunction with the accompanying drawings and this background of the invention.

BRIEF SUMMARY OF THE INVENTION

An optical waveguide device is provided for receiving light that has a guided mode and an unguided mode. The waveguide device comprises an optically transmissive substrate having first and second substantially opposite surfaces, an input end, and an output end. An optical waveguide region is disposed within the substrate and extends from the input to the output. A plurality of electrodes is disposed on the first surface at predetermined locations with respect to the waveguide region. The device includes a plurality of optical barriers each disposed proximate one of the first and second surfaces and positioned to block a different optical path of the unguided mode.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
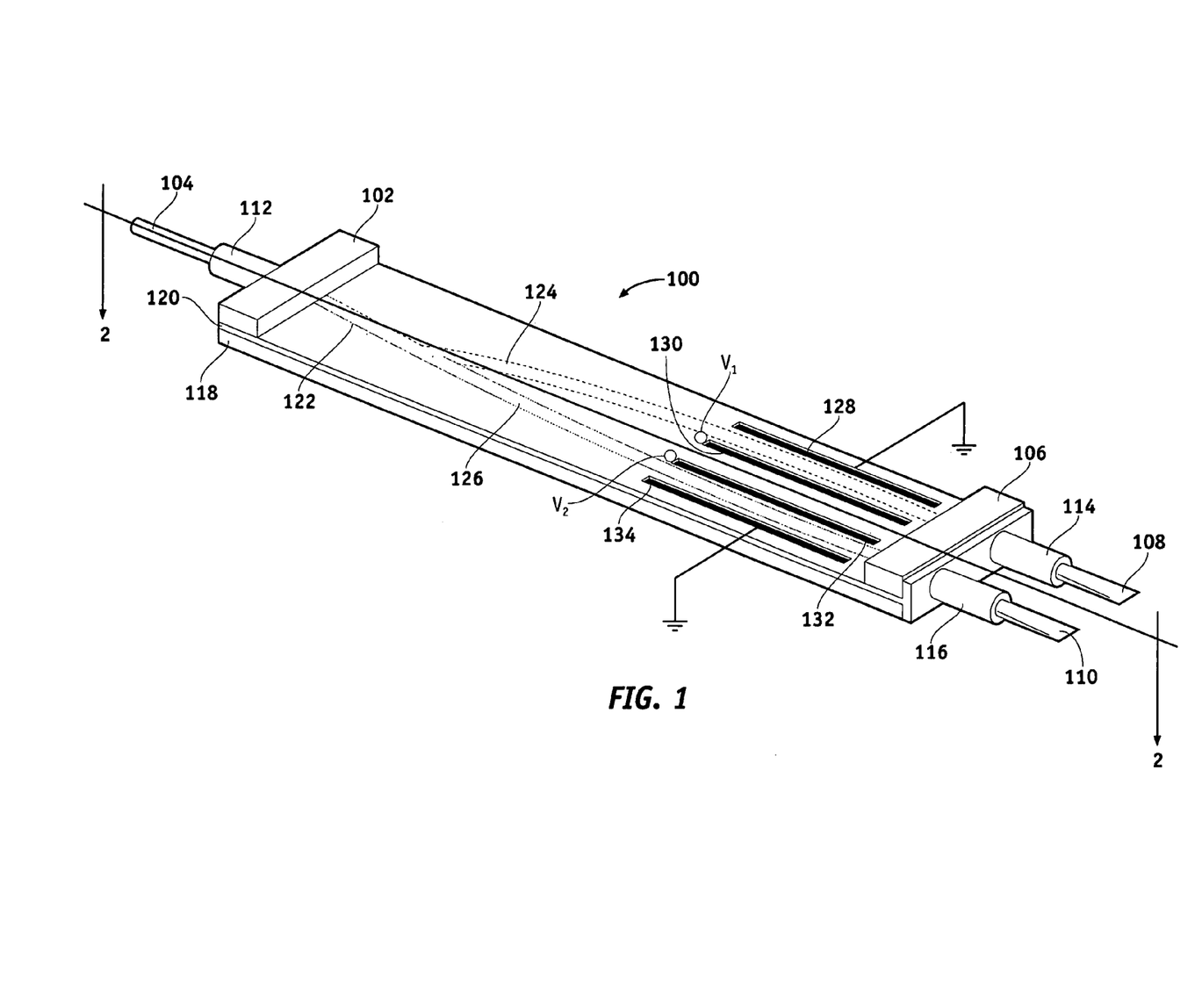
FIG. 1 is an isometric view of a dual output optical modulator.

FIG. 1 is an isometric view of a known electro-optic device 100 (e.g., an optical modulator) comprising a first end 102 optically coupled to an input optical fiber 104 and a second end 106 optically coupled to a first output optical fiber 108 and to a second output optical fiber 110. Optical fibers 104, 108, and 110 are coupled to electro-optic device 100 through ferrules 112, 114, and 116, respectively. An optically transmissive substrate 118 comprising an electro-optic crystal (e.g., lithium niobate) and extending from first end 102 to second end 106 of device 100 has an optical waveguide 122 formed therein and a buffer layer 120 (e.g., $SiO_2$, room temperature vulcanizer potting material, etc.) disposed thereon. As can be seen in FIG. 1, waveguide 122 bifurcates into a first waveguide section 124 and a second waveguide section 126 for guiding light through substrate 118 and ultimately to output fibers 108 and 110, respectively. Waveguide sections 124 and 126 are configured to pass between first and second pairs of electrodes that are deposited on the upper surface of substrate 118. More particularly, waveguide section 124 passes between electrodes 128 and 130, and waveguide section 126 passes between electrodes 132 and 134.

Input fiber 104 delivers light into substrate 118 that separates into substantially a guided and an unguided mode; for example, an unguided transverse magnetic (TM) mode and a guided transverse electric (TE) mode. As it propagates along waveguide sections 124 and 126, the guided TE mode light passes between paired electrodes 128 and 130 and paired electrodes 132 and 134, respectively, which are each configured to have a voltage applied across them. For example, one electrode in each pair may be grounded, while the other electrode may have a voltage applied thereto. Referring specifically to FIG. 1, electrodes 128 and 134 may be grounded, electrode 130 may be coupled to a first voltage $V_1$, and electrode 132 may be coupled to a second voltage $V_2$. The index of refraction of substrate 118 varies in response to the voltages applied to electrodes 130 and 132, and the phases of the optical signals traveling between the electrode pairs are correspondingly modulated.

Figure 2:
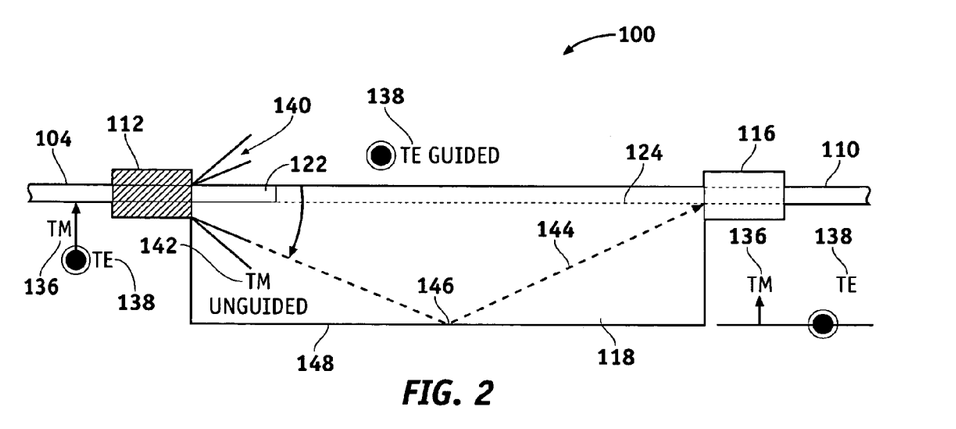
FIGS. 2 and 3 are side cross-sectional views of the optical modulator shown in FIG. 1 taken along line 2-2.

FIG. 2 is a representative cross-sectional view of electro-optic device 100 shown in FIG. 1 taken along line 2-2. Waveguide section 126, ferrule 116, and output fiber 110 are not shown for clarity. Referring to FIG. 2, the light coupled to substrate 118 by input fiber 104 comprises a TM mode 136 and a TE mode 138. When entering substrate 118, TE mode 138 is guided by waveguide 122 to output fibers 108 and 110 (FIG. 1). In contrast, TM mode 136 light partially exits substrate 118 into an area above device 100 as shown at 140 and partially propagates unguided through substrate 118 as shown at 142. As previously mentioned, a portion of the unguided TM mode 136 light that propagates unguided through substrate 118 may be received by output fibers 118 and 110 (FIG. 1) and thereby degrade the optical modulator's signal quality. It should be appreciated, however, that not all unguided TM mode 136 light is so received; i.e., only light that travels along certain optical paths within substrate 118 arrives at output fibers 108 and 110 (FIG. 1) at an appropriate angle relative to the longitudinal axis of the fiber that permits optical reception. For example, unguided mode 136 light traveling along primary and secondary optical paths may be received at output fibers 114 and 116 (FIG. 1).

Figure 3:
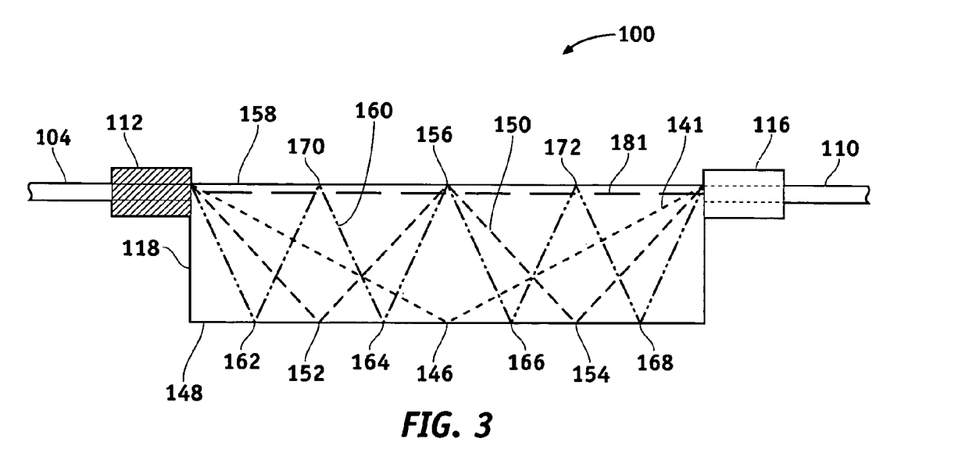

FIG. 3 is also a side cross-sectional view of electro-optic device 100 and illustrates four possible paths unguided TM mode 136 light may travel within substrate 118. These paths are: (1) primary optical reflection path 144 having one transverse reflection point 146 from bottom surface 148; (2) a secondary optical reflection path 150 having two transverse reflection points 152 and 154 from bottom surface 148 and one transverse reflection point 156 from a top surface 158 of substrate 118; (3) a tertiary optical path 160 having four transverse reflection points 162, 164, 166, and 168 from bottom surface 148 and three transverse reflection points 170, 156, and 172 from top surface 158; and (4) direct optical paths 180 and 181 (only path 181 is shown in FIG. 3) that propagate directly from input fiber 104 to output fibers 108 and 110 (FIG. 1) without reflecting off either bottom surface 148 or top surface 158.

In accordance with the present invention, barriers may be disposed within substrate 118 at any of the various transverse reflection points identified above in conjunction with FIG. 3, as well as any other transverse reflection points corresponding to reflection points of other optical paths that may interfere with the guided optical signal, to impede or entirely prevent an unguided mode from reaching one or more output fibers. These barriers may take a variety of forms (e.g., substantially opaque deposits or optical regions having an index of refraction that directs the unguided mode out of substrate), but are preferably baffles (e.g., spatial voids created in substrate 118). Baffles may be created at the desired reflection points in a number of ways including cutting with a diamond saw or a dicing-saw. Furthermore, as will be further illustrated below, the cross-section of the baffles disposed within substrate 118 may take a variety of shapes including a rectangular shape, a saw-tooth shape, a knife-edge shape, etc.

Figure 4:
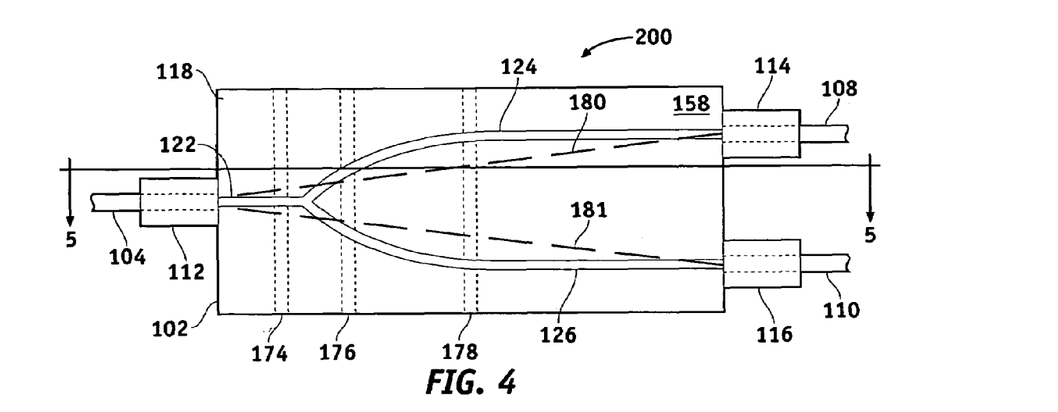
FIG. 4 is a top view of an optical modulator in accordance with a first embodiment of the present invention.
Figure 5:
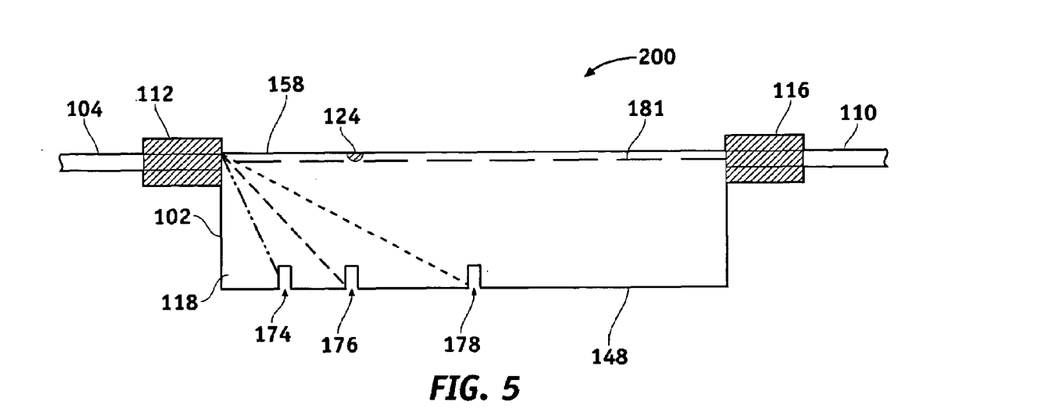
FIG. 5 is a side cross-sectional view of the optical modulator shown in FIG. 4 taken along line 5-5.
Figure 6:
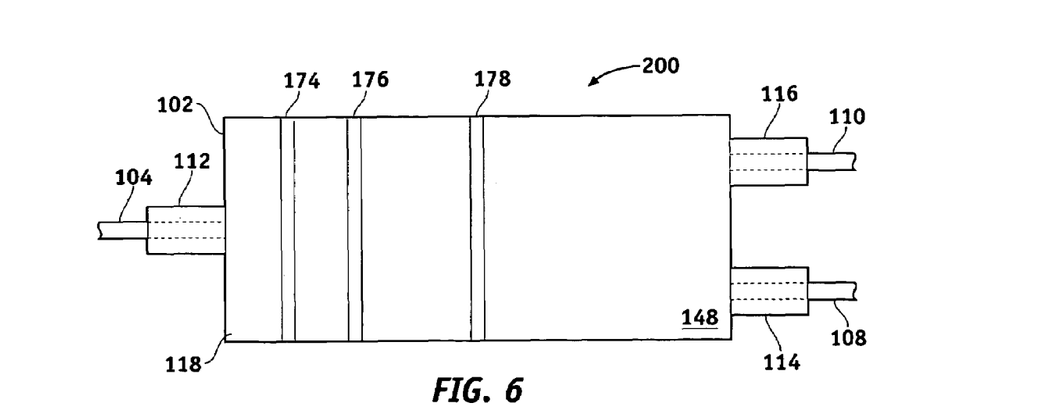
FIG. 6 is a bottom view of the optical modulator shown in FIGS. 4 and 5.

FIGS. 4-6 illustrate a first embodiment of the present invention; i.e., an optical modulator 200 wherein three baffles 174, 176, and 178 having substantially rectangular cross-sections are provided within substrate 118 at different locations along bottom surface 148. In particular, FIGS. 4, 5, and 6 are a top view, a side cross-sectional view taken along line 5-5 of FIG. 4, and a bottom view of modulator 200, respectively. Referring FIGS. 4-6, assuming substrate 118 has a length of X, baffles 174, 176, and 178 may be disposed approximately distances (⅛)X, (¼)X, and (½)X, respectively, from first end 102 of substrate 118. Described another way, baffles 174, 176, and 178 are positioned proximate respective transverse reflection points 162, 152, and 146 discussed above in conjunction with FIG. 3. As FIG. 5 illustrates, by positioning baffles 174, 176, and 178 in this manner, this embodiment of modulator 200 substantially blocks the primary, secondary, and tertiary reflection optical paths 174, 176, and 178. This spatial filter arrangement results in substantially less unguided light reaching and being received at the inputs of fibers 108 and 110 and thus a significantly improves the output signal quality.

Figure 7:
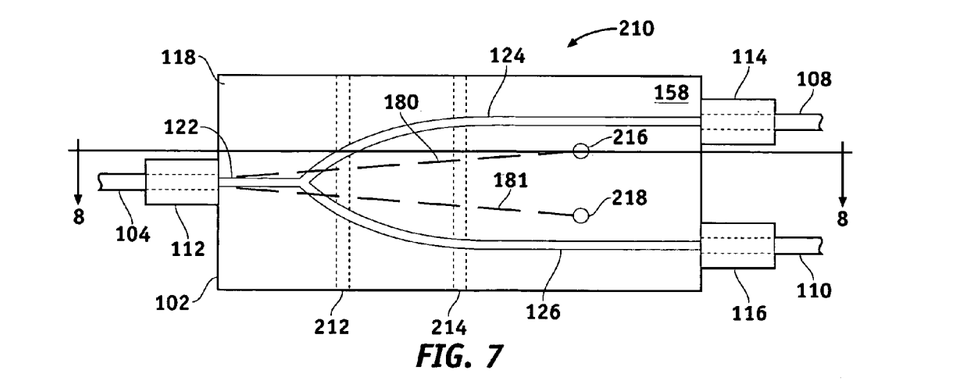
FIG. 7 is a top view of an optical modulator in accordance with a second embodiment of the present invention.
Figure 8:
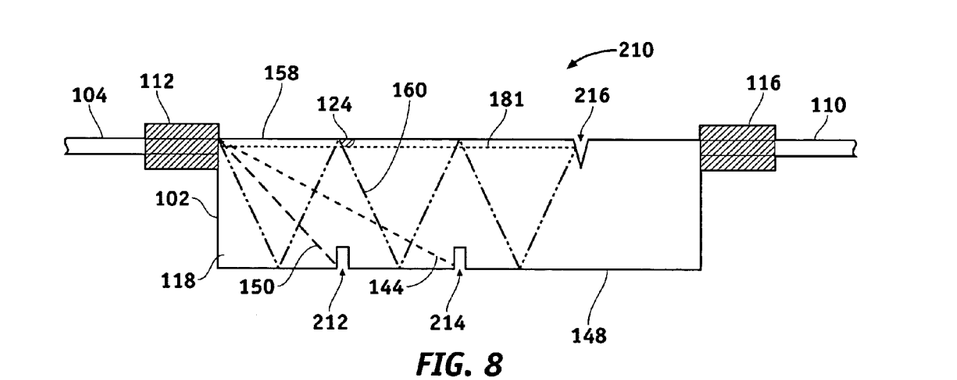
FIG. 8 is a side cross-sectional view of the optical modulator shown in FIG. 7 taken along line 7-7.
Figure 9:
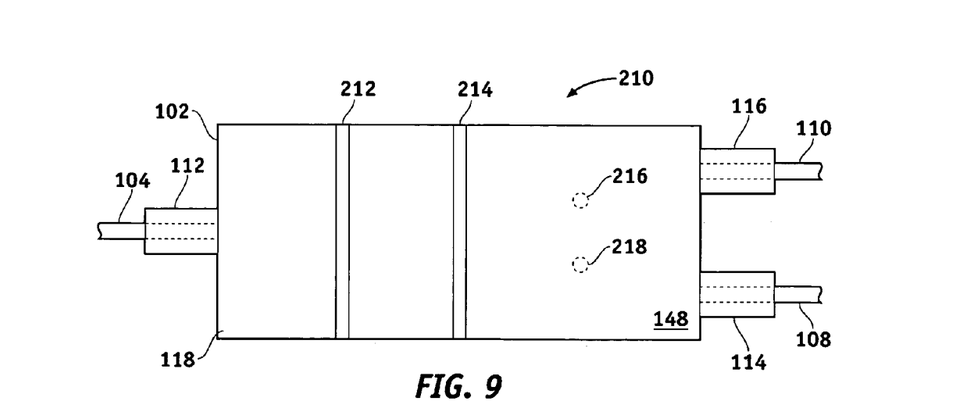
FIG. 9 is a bottom view of the optical modulator shown in FIGS. 7 and 8.

FIGS. 7-9 are a top, side cross-sectional (taken along line 8-8 of FIG. 7), and bottom views, respectively, of a second embodiment of the present invention. In optical modulator 210, two baffles 212 and 214 having a substantially rectangular cross-section are provided within substrate 118 along bottom surface 148. In addition, two narrow baffles 216 and 218 having saw-tooth cross-sections are provided within substrate 118 along upper surface 158. As may be appreciated by comparing FIGS. 7-9 to FIGS. 4-6, baffles 212 and 214 are disposed within optical modulator 200 in substantially the same position as are baffles 176 and 178 within optical modulator 210 and thus substantially block optical paths 150 and 144, respectively, as described above. In contrast to modulator 200, however, optical path 160 is substantially blocked by narrow baffles 216 and 218 (FIG. 8). In addition, narrow baffles 216 and 218 substantially block direct optical paths 180 and 181 (FIGS. 7 and 8). If substrate 118 has a length of X, baffles 216 and 218 are disposed within top surface 158 approximately (¾)X distance away from first end 102 of substrate 118. It may be noted that narrow baffles 216 and 218 do not span the width of substrate 118 as do elongated baffles 212 and 214; this is because baffles 216 and 218 may not intersect waveguide 122 without disrupting the transmission of light therethrough. However, baffles 212 and 214 may be joined, if desired, so as to form a single, slot-like void. A baffle of this type will be described in greater detail below in conjunction with FIGS. 10-12. The spatial filter configuration of optical modulator 210 substantially blocks primary reflection optical path 144, secondary reflection optical path 150, tertiary reflection optical path 160, and direct optical path 180. As was the case previously, this results in substantially less unguided light being received at output fibers 108 and 110 and, consequently, improved optical quality of the transmitted signal.

Figure 10:
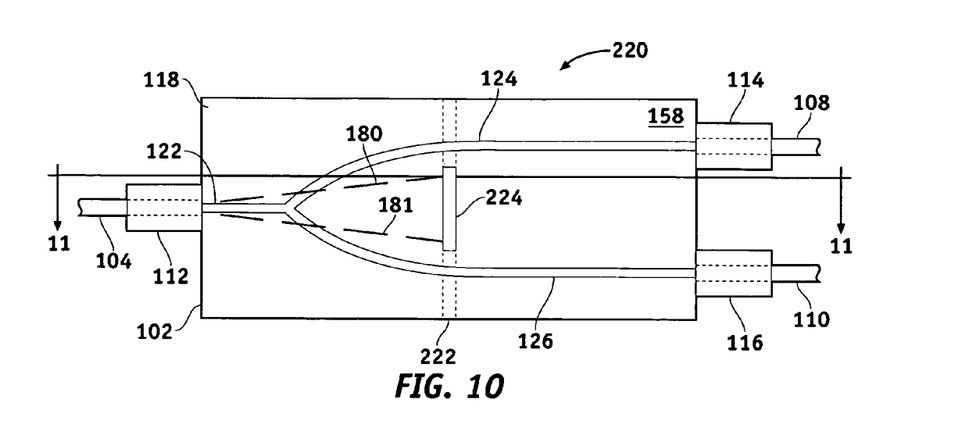
FIG. 10 is a top view of an optical modulator in accordance with a third embodiment of the present invention.
Figure 11:
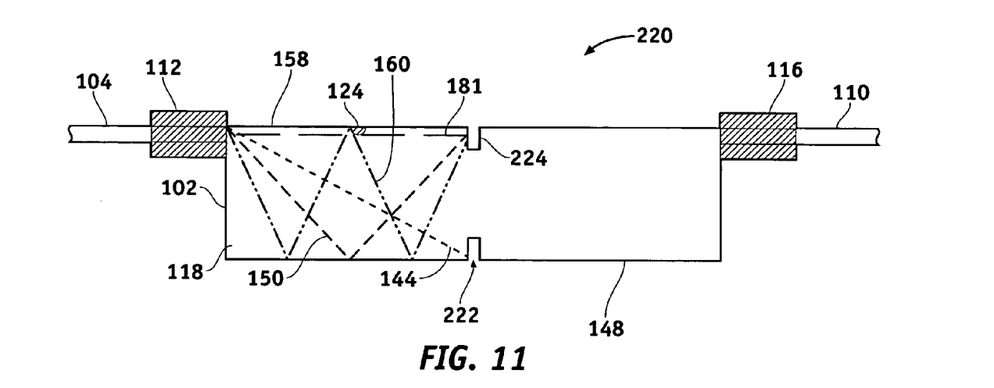
FIG. 11 is a side cross-sectional view of the optical modulator shown in FIG. 10 taken along line 11-11.
Figure 12:
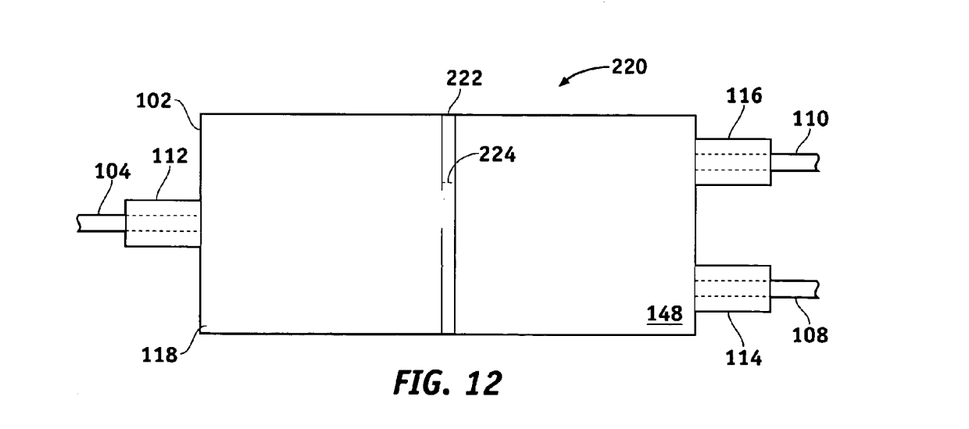
FIG. 12 is a bottom view of the optical modulator shown in FIGS. 10 and 11.

FIGS. 10-12 are top, side cross-sectional (taken along line 11-11 of FIG. 10), and bottom views, respectively, of a third embodiment of the present invention. In optical modulator 220, a first baffle 222 having a substantially rectangular cross-section is provided within substrate 118 proximate bottom surface 148, and a second baffle 224 is provided within substrate 118 proximate upper surface 158. Longitudinally, baffles 222 and 224 are each positioned at approximately the middle region of substrate 118. Baffle 224 is disposed so as to block the optical paths traveling directly from inlet fiber 104 to outlet fibers 108 and 110 (i.e., optical paths 180 and 181) in addition to optical reflection paths 150 and 160. Baffle 222 is disposed so as to block optical path 144 in the manner described above. It should thus be appreciated that the embodiment shown in FIGS. 10-12 is configured to impede or block substantially all of the major optical paths along which unguided light may travel (i.e., the primary, secondary, tertiary, and direct optical paths) to be received at the output fibers with a minimum number of barriers.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical waveguide device for receiving light that has a first mode to be substantially guided and a second mode to be substantially unguided, the device comprising:

an optically transmissive substrate having a length X and including first and second substantially opposite surfaces, an input end, and an output end;

an optical waveguide region disposed within said substrate proximate said second surface and extending from said input end to said output end;

a plurality of electrodes disposed on said first second at predetermined locations with respect to said waveguide region; and a spatial filter, comprising:

a first optical barrier positioned in said substrate proximate said first surface at a distance of substantially (½)X from said input end;

a second optical barrier positioned in said substrate proximate said first surface at a distance of substantially (¼)X from said input end; and a third optical barrier positioned in said substrate proximate said first surface at a distance of substantially (n/8)X from said input end, wherein n is an odd integer less than 8.

2. An optical waveguide device according to claim 1 wherein at least one of said first, second, and third barriers comprises a baffle.

3. An optical waveguide device according to claim 2 wherein said at least one baffle comprises a spatial void in said substrate.

4. An optical waveguide device according to claim 3 wherein said spatial void comprises a longitudinal groove.

5. An optical waveguide device according to claim 1 wherein said waveguide device is an optical modulator.

6. An optical waveguide device according to claim 5 wherein said substrate comprises lithium niobate.

7. An optical waveguide device according for receiving light that has a first mode to be substantially guided and a second mode to be substantially unguided, the device comprising:

an optically transmissive substrate having first and second substantially opposite surfaces, an input end, and an output end;

an optical waveguide region disposed within said substrate and extending from said input end to said output end;

a plurality of electrodes disposed on said second surface at predetermined locations with respect to said waveguide region; and a plurality of optical barriers each disposed proximate one of said first and second surfaces and positioned to block a different optical path of the unguided mode;

wherein said substrate has a length of X and a first barrier is disposed proximate said first surface at a distance of approximately (½)X from said input end, and wherein a second baffler is disposed proximate said second surface at a distance of approximately (½)X from said input end.

8. An optical waveguide device according to claim 7 wherein a third barrier is disposed at a distance of approximately (¼)X from said input end.

9. An optical waveguide device according to claim 8 wherein said third barrier is disposed proximate said second surface.

10. An optical waveguide device according to claim 7 wherein a third barrier is disposed proximate said first surface at a distance of approximately (⅛)X from said input end, and said second barrier is disposed proximate said first surface.

11. An optical waveguide device according to claim 7 wherein said plurality of barriers comprises at least one baffle.

12. A waveguide device, comprising:
   an optically transmissive substrate for conducting light that comprises a guided mode and an unguided mode, said substrate including an input end, an output end, an upper surface, and a lower surface;
   an input optical fiber coupled to said input end for delivering light to said substrate;
   an output optical fiber coupled to said output end for receiving light from said substrate;
   a waveguide disposed proximate said upper surface and extending from said first end to said second end; and
   an optical barrier disposed proximate said upper surface and positioned to block a direct optical path traveled by said unguided mode through said substrate.

13. An optical waveguide device according to claim 12 wherein said substrate has a length of X and at least one baffle is disposed proximate said lower surface at a distance of approximately (½)X from said input end.

14. An optical waveguide device according to claim 13 wherein a second baffle is disposed proximate said upper surface at a distance of approximately (½)X from said input end.

15. An optical waveguide device according to claim 13 wherein a second baffle is disposed at a distance of approximately (¼)X from said input end.

16. An optical waveguide device according to claim 15 wherein said second baffle is disposed proximate said lower surface.

17. An optical waveguide device according to claim 15 wherein a third baffle is disposed proximate said lower surface at a distance of approximately (⅛)X from said input end, and said second baffle is disposed proximate said lower surface.

18. An optical waveguide device according to claim 17 wherein said waveguide device is an optical modulator and said substrate comprises lithium niobate.

* * * * *

UNITED STATES PATENT AND TRADEMARK OFFICE
CERTIFICATE OF CORRECTION

PATENT NO. : 7,366,372 B2 Page 1 of 1
APPLICATION NO. : 11/364024
DATED : April 29, 2008
INVENTOR(S) : Lange et al.

It is certified that error appears in the above-identified patent and that said Letters Patent is hereby corrected as shown below:

In Claim 7 at Column 6, Line 54 the word "baffler" should be --barrier--

Signed and Sealed this

Second Day of September, 2008

JON W. DUDAS
*Director of the United States Patent and Trademark Office*